(12) United States Patent
Lu et al.

(10) Patent No.: US 11,792,694 B2
(45) Date of Patent: Oct. 17, 2023

(54) PACKET-SWITCHED TO CIRCUIT-SWITCHED HANDOVER DURING VOIP CALL INITIATION

(71) Applicant: T-Mobile USA, Inc., Bellevue, WA (US)

(72) Inventors: Kun Lu, Bellevue, WA (US); Alan Denis MacDonald, Bellevue, WA (US); Egil Gronstad, Encinitas, CA (US); Hsin-Fu Henry Chiang, Bellevue, WA (US); A. Karl Corona, Maple Valley, WA (US); Scott Francis Migaldi, Cary, IL (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/887,353

(22) Filed: May 29, 2020

(65) Prior Publication Data

US 2021/0377817 A1    Dec. 2, 2021

(51) Int. Cl.
*H04W 36/00* (2009.01)
*H04W 80/10* (2009.01)
*H04L 65/1069* (2022.01)
*H04W 36/30* (2009.01)
*H04L 65/1104* (2022.01)

(52) U.S. Cl.
CPC ..... *H04W 36/0022* (2013.01); *H04L 65/1069* (2013.01); *H04L 65/1104* (2022.05); *H04W 36/305* (2018.08); *H04W 80/10* (2013.01)

(58) Field of Classification Search
CPC ............. H04L 65/1006; H04L 65/1069; H04L 65/1016; H04L 65/1095; H04L 65/1104; H04W 36/0022; H04W 36/305; H04W 80/10; H04W 36/0079
See application file for complete search history.

(56) References Cited

U.S. PATENT DOCUMENTS 9,392,626 B2 * 7/2016 Paisal .................. H04W 76/11
10,582,424 B2 * 3/2020 Lu ..................... H04W 36/0022
(Continued)

FOREIGN PATENT DOCUMENTS

CN    106961321 A  *  7/2017

*Primary Examiner* — Khaled M Kassim
*Assistant Examiner* — Kai Chang
(74) *Attorney, Agent, or Firm* — Lee & Hayes, P.C.

(57) ABSTRACT

When initiating a Voice-over-IP (VoIP) communication session between an originating device (MO) and a terminating device (MT) on a packet-switched network, network components associated with the MO may encounter a failure when preparing resources for the session, such as a failure to establish a dedicated bearer with the MO. This might typically cause the system to abort the session. Instead, the network components are configured to detect the failure and to initiate a handover to a circuit-switched communication network so that the session may be conducted through the circuit-switched communication network. The failure may be detected by a component of a Long-Term Evolution (LTE) Radio Access Network (RAN) of the network, by a Mobility Management Entity (MME) of the network, or by some other network component. Single Radio Voice Call Continuity (SRVCC) procedures may be used to implement the handover.

20 Claims, 5 Drawing Sheets

(56) References Cited

U.S. PATENT DOCUMENTS

| | | | | |
|---|---|---|---|---|
| 2015/0131619 A1* | 5/2015 | Zhu | H04W 36/0079 |
| | | | 370/332 |
| 2015/0229758 A1* | 8/2015 | Tanaka | H04W 36/0022 |
| | | | 370/259 |
| 2015/0296422 A1* | 10/2015 | Melin | H04W 36/0022 |
| | | | 370/331 |
| 2015/0358477 A1* | 12/2015 | Jeong | H04W 40/24 |
| | | | 370/259 |
| 2016/0021580 A1* | 1/2016 | Mufti | H04W 36/305 |
| | | | 370/221 |
| 2016/0029228 A1* | 1/2016 | Mufti | H04W 76/19 |
| | | | 370/225 |
| 2016/0087913 A1* | 3/2016 | Wang | H04L 65/1104 |
| | | | 370/230 |
| 2016/0135093 A1* | 5/2016 | Wong | H04W 36/0022 |
| | | | 370/331 |
| 2016/0345210 A1* | 11/2016 | Shan | H04W 64/003 |
| 2017/0094565 A1* | 3/2017 | Sharma | H04L 65/1016 |
| 2017/0094574 A1* | 3/2017 | Singh | H04W 36/16 |
| 2017/0295530 A1* | 10/2017 | Chen | H04W 36/0022 |
| 2018/0007588 A1* | 1/2018 | Lin | H04W 76/15 |
| 2018/0103497 A1* | 4/2018 | Chiang | H04W 76/18 |
| 2019/0297538 A1* | 9/2019 | Keller | H04W 36/0022 |
| 2019/0327630 A1* | 10/2019 | Lin | H04W 36/0058 |
| 2021/0235334 A1* | 7/2021 | Purkayastha | H04W 76/11 |

\* cited by examiner

PACKET-SWITCHED TO CIRCUIT-SWITCHED HANDOVER DURING VOIP CALL INITIATION

BACKGROUND

Cellular communication network providers may use various technologies for implementing communication services. Over time, communication capabilities have improved vastly in accordance with a succession of standards and specifications.

Early cellular systems were circuit-switched communication networks, in which a dedicated communication channel was established between two cellular handsets for voice communications. $2^{nd}$-Generation (2G) and $3^{rd}$-Generation (3G) networks are examples of circuit-switched communication networks.

More recent cellular network implementations use packet switching, in which voice data is broken into blocks and transmitted as individually formatted packets. $4^{th}$-Generation (4G) and $5^{th}$-Generation (5G) networks are examples of packet-switched communication networks.

As newer communication technologies are implemented, a network provider may retain older technologies and the two technologies may co-exist. This is particularly useful during the deployment of new technologies, allowing the new technologies to be introduced gradually throughout a network.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are techniques for initiating voice calls or other communication sessions between mobile devices of a cellular communication network. In particular, the techniques may be used in a Long-Term Evolution (LTE) or other packet-switched cellular network to reduce the number of dropped calls that might otherwise occur when there is a failure to set up communication resources on the originating side of the call.

In a packet-switched communication network such as an LTE network, a Voice-over-IP (VOIP) session begins with the originating cellular device sending a Session Initiation Protocol (SIP) INVITE message to a terminating cellular device. The terminating cellular device responds, and both sides start preparing wireless resources for the session. In networks that do not implement precondition, the terminating cellular device may also, after terminating side resources have been set up, begin ringing to alert the device user of an incoming call, based on the assumption that the originating cellular device is ready to proceed. In some cases, however, there may have been a failure to set up the resources for the originating cellular device, resulting in an abort message that terminates the session. In the meantime, however, the terminating device user might have picked up to a dropped call.

As described herein, components of a cellular communication network are configured to initiate a handover to a circuit-switched system, such as a $3^{rd}$-Generation (3G) cellular system, rather than sending an abort message as described above. In LTE systems, this may be accomplished using what is referred to as a Packet Switch to Circuit Switch handover, which shifts the originating cellular device to a packet-switched communication network as an alternative to aborting the session. This technique uses a procedure referred to as Single Radio Voice Call Continuity (SRVCC) or Enhanced Single Radio Voice Call Continuity (eSRVCC) The described techniques can be used to reduce call set up failures and to thereby improve user experiences.

Figure 1:
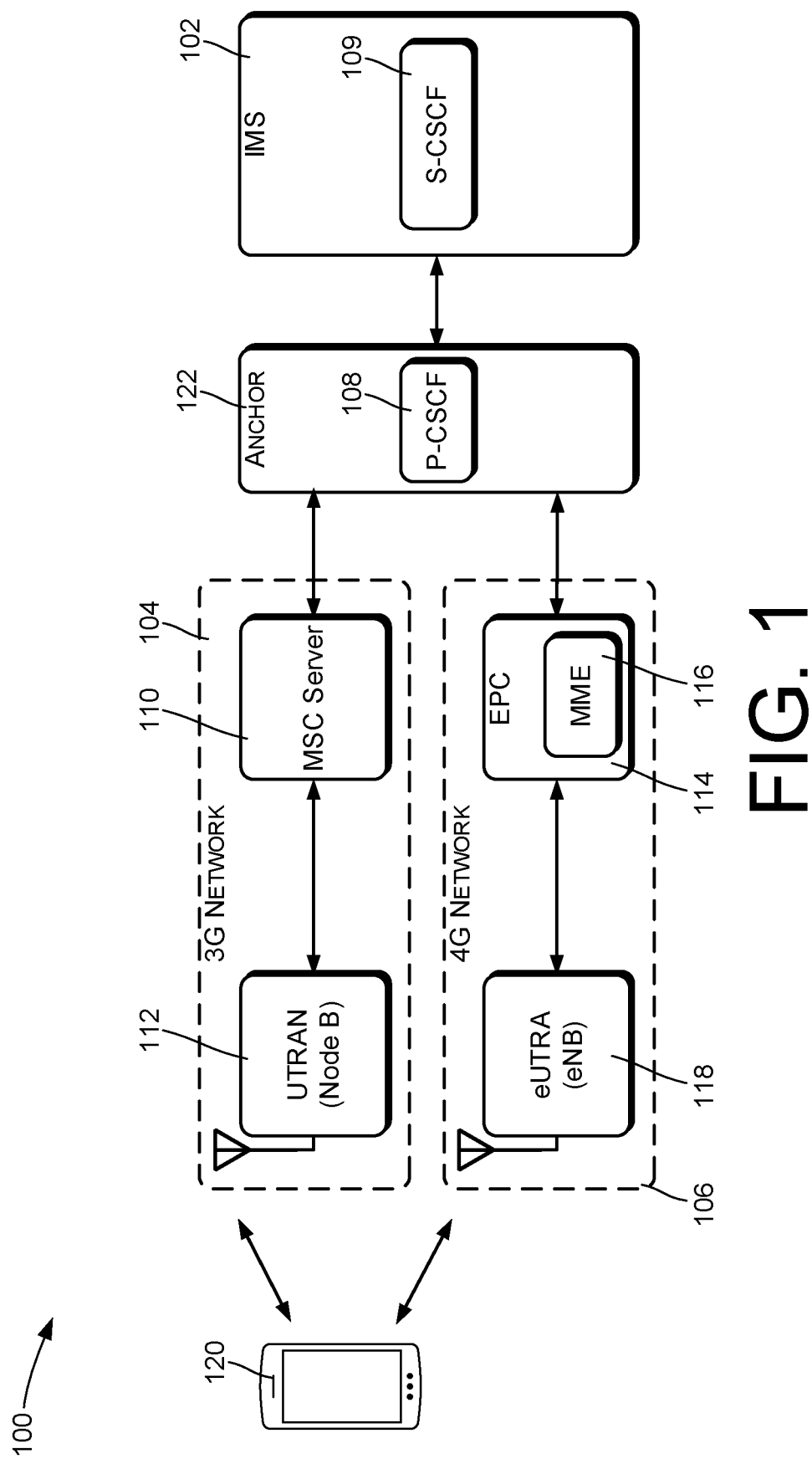
FIG. 1 is a block diagram showing relevant components of a communication network that supports both $3^{rd}$-Generation (3G) and $4^{th}$-Generation (4G) systems.

FIG. 1 illustrates an example cellular communication system 100 in which the described techniques may be implemented. The system 100 comprises an IP Multimedia Subsystem (IMS) 102 that provides IP multimedia services such as messaging, video conferencing, and so forth. The system 100 also includes a $3^{rd}$-Generation (3G) circuit-switched communication network 104 and a $4^{th}$-Generation (4G) packet-switched communication network 106, which may be referred to herein as the 3G network 104 and the 4G network 106, respectively.

The IMS 102 includes a Proxy Call Session Control Function (P-CSCF) 108 and Serving Call Session Control Function (S-CSCF) 109, as well as various other components and functions in accordance with relevant standards and specifications. Note that although the P-CSCF 108 is considered part of the IMS 102, it is illustrated as being associated with an anchor component 122, which will be described below. The P-CSCF 108 is at the local network, associated with the anchor component 122 and an anchor Access Transfer Control Function (ATCF), and the S-CSCF 109 is at the home network.

The 3G network 104 may include a Global System for Mobiles (GSM) or Code Division Multiple Access (CDMA) network, both of which are relatively old technologies that use legacy circuit switching techniques for voice communications. In some networks, a $2^{nd}$-Generation (2G) communication network may be present as an alternative or additional circuit-switched network.

The 3G network 104 includes a Mobile Switching Center (MSC) server 110 for implementation of core functions. The 3G network 104 also has a Radio Access Network (RAN), which in this example is implemented by a Universal Mobile Telecommunications System (UMTS) interface 112, which may also be referred to as a UMTS Terrestrial Radio Access Network (UTRAN) 112. The UTRAN 112 may also at times be referred to as a Node B or as a 3G base station.

The 4G network 106 may comprise a Long-Term Evolution (LTE) network, as one example. In some networks, a $5^{th}$-Generation (5G) packet-switched communication network may be present as an alternative to or in addition to the 4G network 106.

The 4G network 106 may include a 4G Evolved Packet Core (EPC) 114 that implements various network functionality in accordance with relevant 4G standards and specifications. The EPC 114 includes a control node such as a Mobility Management Entity (MME) 116. The MME 116 participates in or is responsible for various tasks, including bearer activation and deactivation. The MME 116 is also responsible for user mobility and interworking with other EPC nodes. Other components of the EPC 114 not shown in FIG. 1 may include a Policy and Charging Rules Function (PCRF), one or more of a Serving Gateway (SGW) and a Packet Data Network Gateway (PGW). These elements will be referenced in the discussion of FIG. 3.

The 4G network 106 also has a RAN, which in this example comprises an Evolved Universal Terrestrial Radio Access (eUTRA) interface 118, as an example. The eUTRA interface 118 may also at times be referred to as an eNodeB, eNB, or as a 4G base station.

The 3G network 104 and the 4G network 106 have various other components, as typical in such systems, that are less relevant to this discussion and which are not shown in FIG. 1.

The example of FIG. 1 includes a cellular communication device 120 that is capable of communications using either of the 3G circuit-switched communication network 104 and the 4G packet-switched communication network 106. The cellular communication device 120 may comprise any of various types of wireless cellular communication devices that are capable of wireless data and/or voice communications, including smartphones and other mobile devices, "Internet-of-Things" (IoT) devices, smarthome devices, computers, wearable devices, entertainment devices, industrial control equipment, etc. In some environments, the cellular communication device 120 may be referred to as a User Equipment (UE) or Mobile Station (MS).

The system 100 may also include an anchor 122. The anchor 122 comprises an Access Transfer Control Function (ATCF) and/or an Access Transfer Gateway (ATGW). The anchor 122 is provided to anchor local media so that voice calls can be handled in different ways without affecting remote networks. The P-CSCF 108 is located locally together with anchor 122 communicates with the MSC Server 110 and the EPC 114 through the anchor 122 to S-CSCF 109.

The illustrated components of the 3G circuit-switched communication network 104 and the 4G packet-switched communication network 106 are examples of multiple instances of such components that are used in networks such as those described. Similarly, the illustrated cellular communication device 120 is an example of multiple such devices that are used in conjunction with the networks 104 and 106.

Although certain techniques are described herein in the context of 3G and 4G communication networks, the techniques described herein may also be used with different network types, standards, and technologies. That is, the techniques may be used more generally for packet-switched and circuit-switched wireless communication networks, where a 4G network is an example of a packet-switched wireless communication network and a 3G network is an example of a circuit-switched wireless communication network. Techniques similar to those described here can also be used for 5G Standalone Voice Over New Radio (VoNR) in order to provide a 4G fallback. For example, similar situations might trigger an Evolved Packet System Fallback (EPSFB), rather than an Abort Session message, to move a session to a 4G network and to thereby save the call.

Figure 2:
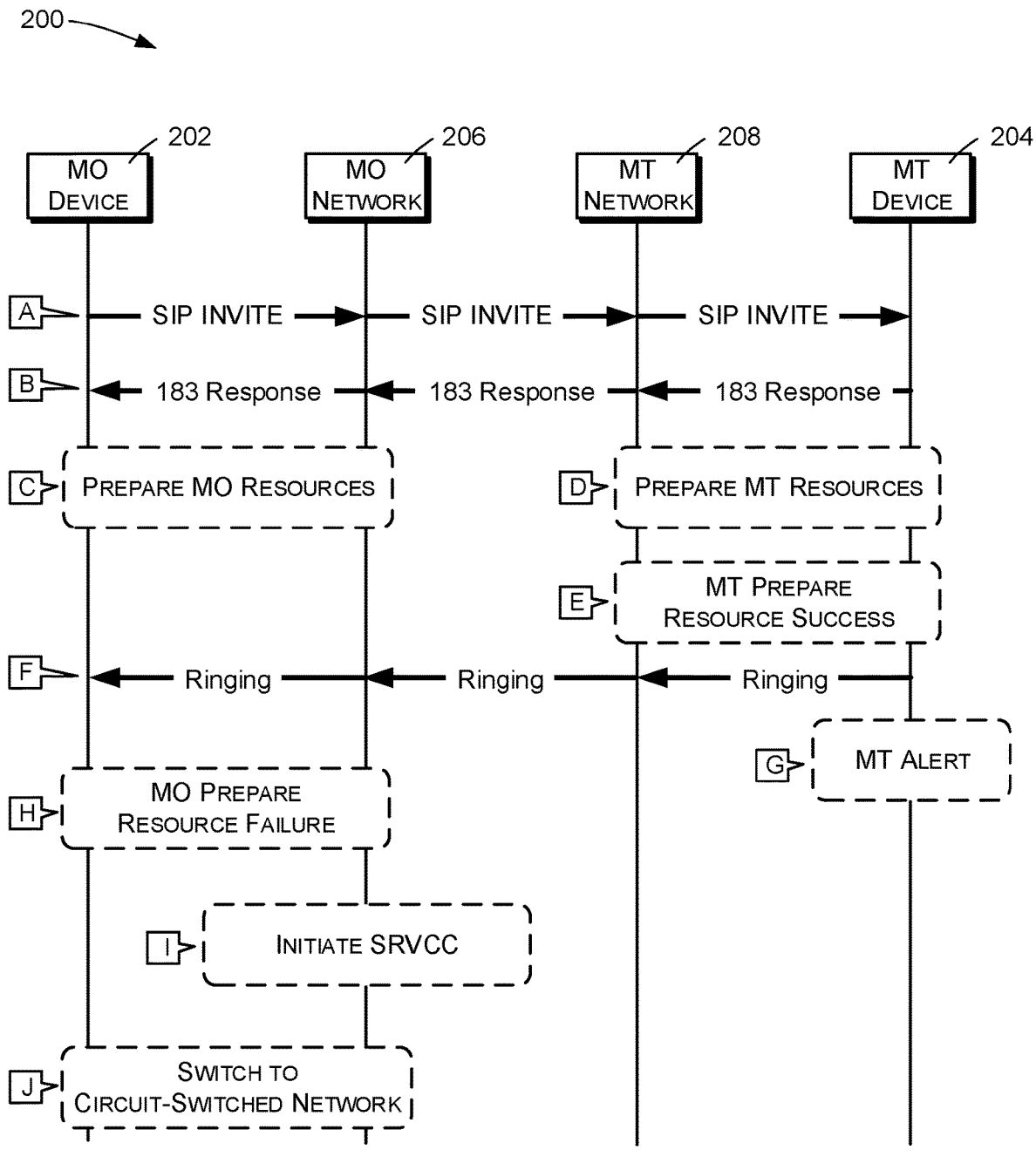
FIGS. 2 and 3 are diagrams illustrating example call flows that may occur when initiating a voice communication session between cellular devices.
Figure 3:
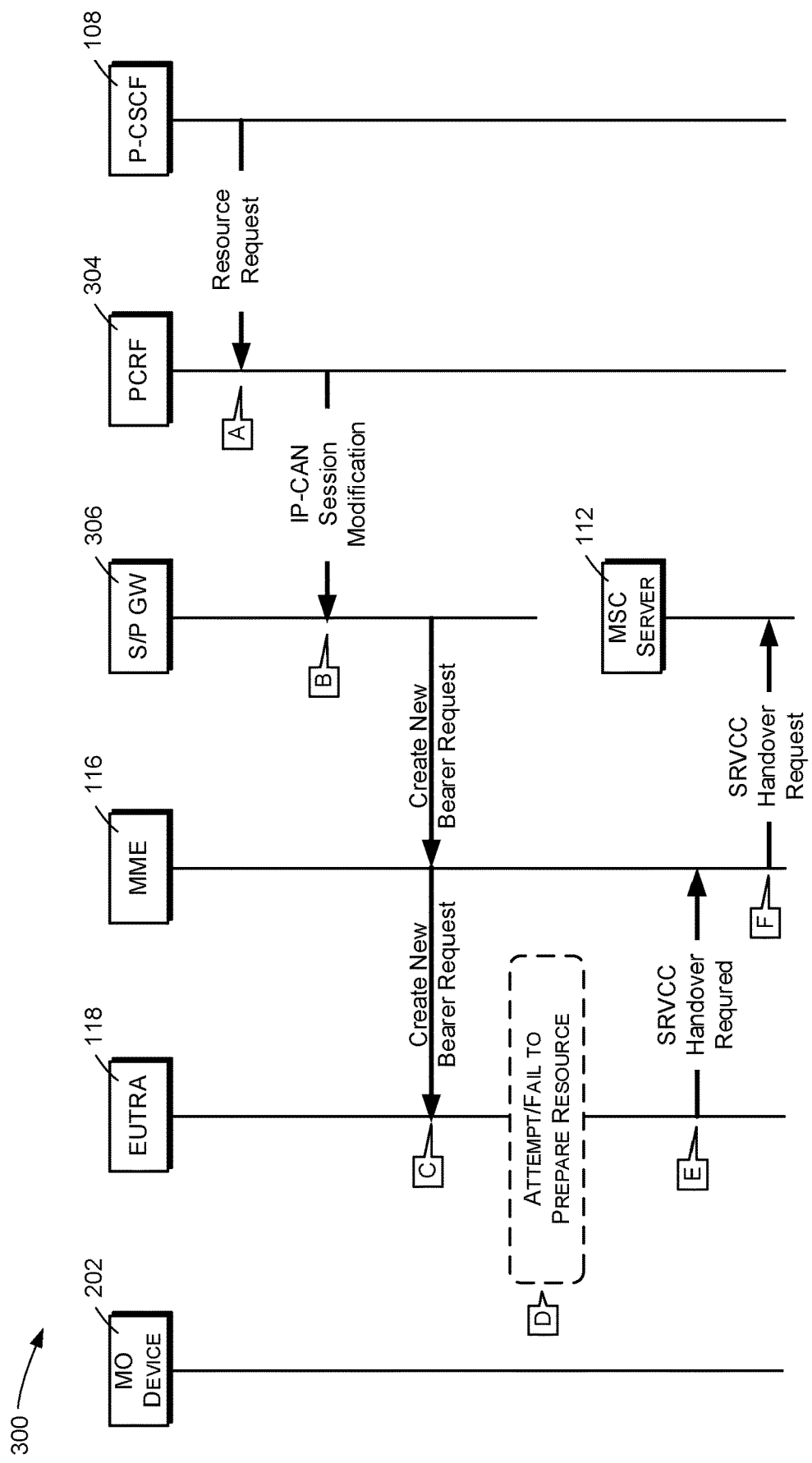

FIGS. 2 and 3 illustrate communications that may at times occur when setting up a communication session between devices in a cellular communication system such as shown in FIG. 1. A cellular communication system such as this may, for example, include a packet-switched communication network such as a $4^{th}$-Generation (4G) Long-Term Evolution (LTE) cellular communication network. The 4G LTE network may be associated with a $3^{rd}$-Generation (3G) circuit-switched cellular communication network, which may at times be used when 4G systems fail or are otherwise unavailable. 3G cellular systems typically comprise older technology in comparison to 4G systems, and a 3G system may sometimes be referred to as a legacy system. The described techniques may also be used in conjunction with other types of networks, such as $5^{th}$-Generation (5G) networks that are backed up by 4G technologies.

The communications shown by FIGS. 2 and 3 may be performed by components of the system 100 when attempting to set up a packet-switched voice session. In particular, the IMS 102 may initially attempt to set up the voice session through the 4G network 106. If this fails, 4G network 106 might initiate the SRVCC to the 3G network 104 instead of aborting the session.

In FIGS. 2 and 3, communicating components or entities are shown with respectively corresponding vertical lines extending downward therefrom. Communications are indicated by arrows that extend from and to the vertical lines corresponding to the entities from which the communications originate and terminate, respectively. Actions performed by the components or entities, or events involving the components or entities, are shown as dashed boxes. Communications and actions occur in order from top to bottom, although relative order of the communications and actions may at times differ from that shown and some communications and actions may be performed concurrently. Lettered callouts are used to indicate specific communications or actions. In some cases, an individual callout may refer to a group of related communications or actions.

Note that FIGS. 2 and 3 illustrate the most relevant communications and may omit other communications that occur in practice but are less relevant to the topics at hand Such other communications may include communications that both precede and follow the illustrated communications, communications that occur in time between the illustrated communications, and communications that occur between components or entities that are not shown. The illustrated components, and their subcomponents, may also perform actions that are not specifically shown in FIGS. 2 and 3. Furthermore, communications between two illustrated components may at times pass through intermediate components that are not shown.

Referring first to FIG. 2, a call flow 200 is performed when initiating a voice call from a first cellular device 202, which in this context is also referred to as a mobile originating (MO) device 202, to a second cellular device 204, which in this context is referred to as a mobile terminating (MT) device 204. The MO device 202 might be associated with a home network 206, which for purposes of discussion will be referred to as the MO network 206. The MT device 204 may be associated with its own home network 208, which for purposes of discussion will be referred to as the MT network 208. Each of the networks 206 and 208 supports 4G packet-switched communications. One or both of the networks 206 and 208 support 3G circuit-switched communications. In the examples herein, it is assumed that the MO device 202 and the MO network 206 support 3G circuit-switched communications. In some implementations, each of the networks 206 and 208 may comprise an instance of the system 100 of FIG. 1. That is, each of the MO network 206 and the MT network 208 may have an IMS 102, a 3G network 104, and a 4G network 106.

The MO device 202 and the MT device 204 may be instances of cellular communication devices such as the device 120 shown in FIG. 1.

At "A" of FIG. 2, the MO device 202 sends a Session Initiation Protocol (SIP) INVITE message to the MT device 204, through the MO network 206 and the MT network 208. The SIP INVITE message is used to initiate a packet-based Voice-over-IP (VOIP) communication session between the MO device 202 and the MT device 204. In this context, a VOIP communication session may also be referred to as a Voice-over-LTE (VoLTE) session.

At "B", In response to receiving the SIP INVITE message, the MT device 204 sends a SIP 183 session progress response back to the MO device 202, as an acknowledgement that the MT device 204 has received the SIP INVITE message and that the MT network 208 will set up a bearer for the requested VOIP communication session. The SIP 183 session progress response also contains information about the session such as codec information, media type, data rates, port number, etc.

At "C", the MO device 202 and the MO network 206 prepare or attempt to prepare radio resources for the requested VOIP communication session. This may include establishing and/or preparing resources for a dedicated bearer between the MO device 202 and the eUTRA 118 of the MO network 206.

At "D", the MT device 204 and the MT network 208 prepare radio resources for the requested VOIP communication session. This may include establishing and/or preparing resources for a dedicated bearer between the MT device 204 and the eUTRA 118 of the MT network 208.

At "E" the MT device 204 and the MT network 208 are successful in preparing a dedicated bearer with the MT device 204 and/or other MT RAN resources.

At "F", the MT device 204 sends a SIP RINGING message back to the MO device 202. At G, the MT device 204 begins alerting the user of the MT device 204, such as by playing a ringtone or initiating a vibration, indicating an incoming call that can be answered by the user of the MT device 204.

At "H", the MO device 202 and the MO network 206 have been unsuccessful in preparing MO radio resources and/or establishing a dedicated bearer with the MO device 202. This may happen when the eUTRA 118 of the MO network 206 has insufficient resources or because of a communication failure or other failure when setting up resources.

At "I", rather than aborting the session in response to the MO resource setup failure, as might happen in some networks, the MO network 206 is configured to instead initiate a handover to a circuit-switched communication network, such as the 3G circuit-switched communication network 104 of FIG. 1. More specifically, the MO network 206 is configured to initiate a Single Radio Voice Call Continuity (SRVCC) handover or Enhanced Single Radio Voice Call Continuity (eSRVCC) handover. SRVCC and eSRVCC are procedures that can be used by the IMS 102 to transfer a voice call from a 4G/LTE network to an associated legacy packet-switched communication network such as a 2G or 3G network. In this case, however, it is used to transfer a VOIP session that has not yet been established. Specifically, upon a failure to set up a voice session using 4G/LTE, the voice session is transferred to the 2G or 3G network using the SRVCC procedure.

At J, the MO side of the voice session is set up using the 2G or 3G packet-switched communication network in accordance with applicable standards and specifications for circuit-switched sessions, thereby saving the call session from being aborted.

FIG. 3 illustrates further details regarding network communications involved in setting up MO LTE resources and initiating an SRVCC or eSRVCC handover in response to a failure to set up or otherwise prepare the MO resources. Specifically, FIG. 3 illustrates a call flow 300 that may be performed by the MO device 202 and the MO network 206 when attempting to prepare a resource such as a dedicated bearer in order to initially set up a voice communication session. The call flow is described with reference to the components of FIG. 1.

At "A", the Proxy Call Session Control Function (P-CSCF) 108 of the IMS 102 sends a Resource Request to a Policy and Charging Rules Function (PCRF) 304 of the EPC 114.

At "B", the PCRF 304 sends an IP Connectivity Access Network (IP-CAN) Session Modification message to a gateway 306 of the EPC 114, such as a Packet Data Network Gateway (PGW) or Serving Gateway (SGW).

At "C", the gateway 306 sends a Create New Bearer Request message to the MME 116 of the EPC 114. The MME 116 forwards the Create New Bearer Request to the eUTRA 118 of the MO network 206.

At "D", the eUTRA 118 attempts and fails to prepare the requested dedicated bearer and/or to otherwise prepare resources as requested.

At "E", in response to the failure to prepare the requested dedicated bearer, the eUTRA 118 sends an SRVCC Handover Required message to the MME 116. The MME 116 responds by sending an SRVCC Handover Request to the MSC server 110 of the 3G circuit-switched network 104. This invokes the SRVCC process, which transfers the requested voice session to the circuit-switched 3G network 104.

Figure 4:
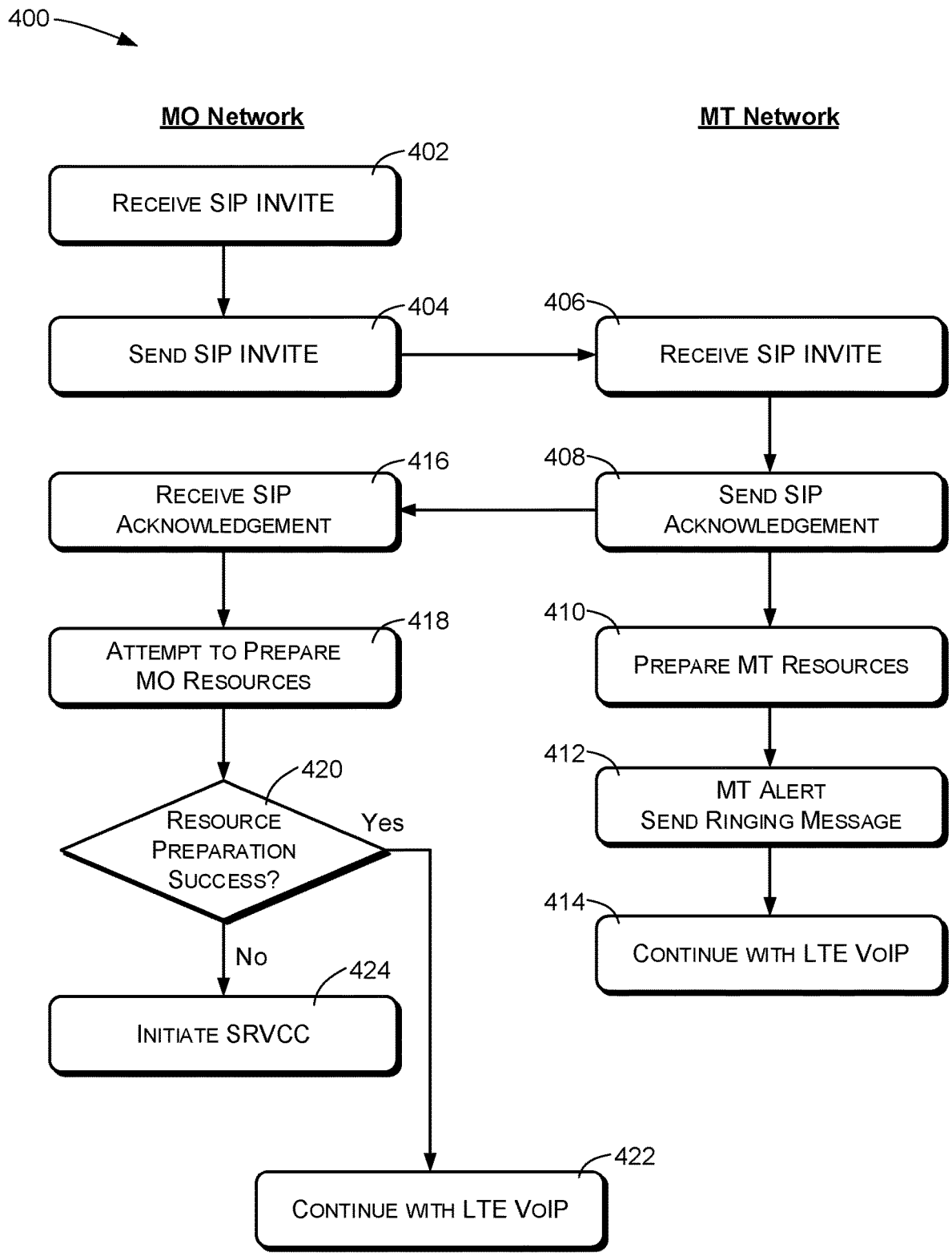
FIG. 4 is a flow diagram illustrating an example method that may occur within a cellular communication network when initiating a voice communication session.

FIG. 4 illustrates an example method 400 that may be performed by one or more components of a cellular communication network to establish a voice communication session between an originating device (MO) and a terminating device (MT). The example method 400 may performed, for example, in a packet-switched cellular communication network such as a 4G or later-generation network. In many cases, a 4G network or 5G network will be associated with a legacy, circuit-switched cellular communication network such as a 3G LTE or earlier-generation cellular communication system. The example method 400 will be described in the context of FIGS. 1-3, although the method is also applicable in other environments.

Actions on the left side of FIG. 4 are performed in this example by the MO network 206. Actions on the right side of FIG. 4 are performed in this example by the MT network 208.

An action 402, by the MO network 206, comprises receiving a SIP INVITE message from the MO device 202 to initiate a voice communication session. In an action 404, the MO network 206 sends the SIP INVITE message to the MT network 208. At 406, the MT network 208 receives the SIP INVITE message.

An action 408, performed by the MT network 208 in response to the SIP INVITE message, comprises sending an acknowledgement to the MO network 206 and MO device 202. For example, the acknowledgement may comprise a SIP 183 Response message.

An action 410, also performed by the MT network 208 in response to the SIP INVITE message, comprises preparing wireless communication resources of the MT network 208 for a dedicated bearer with the MT device 204. For example, the MT network 208 may communicate with an eUTRA of the MT network 208 to set up a dedicated bearer with the MT device 204.

An action 412, also performed by the MT network 208 in response to the SIP INVITE message, comprises initiating an alert at the MT device 204. For example, the MT device 204 might vibrate or produce a sound to indicate an incoming voice call.

An action 414, again performed by the MT network 208, comprises continuing with further actions and communications to complete and conduct the requested voice communication session, in accordance with LTE standards and specifications for VoIP sessions.

An action 416, by the MO network 206, comprises receiving the SIP acknowledgment that was sent by the MT network 208 in the action 408.

An action 418, performed by the MO network 206 in response to receiving the SIP acknowledgement, comprises attempting to prepare wireless communication resources of the MO network 206 for a dedicated bearer with the MO device 202. More specifically, the action 418 may include attempting to prepare wireless communication resources of the 4G LTE packet-switched communication network 106 of the MO network 206 to setup the dedicated bearer with the MO device 202.

An action 420 comprises detecting whether the attempt to prepare the resources of the 4G LTE packet-switched communication network 106 of the MO network 206 was successful. If the resource preparation was successful, an action 422 is performed of continuing with further actions and communications to complete and conduct the requested voice communication session in accordance with LTE VoIP standards and specifications.

In response to detecting, in the action 420, a failure of preparing the wireless communication resources of the 4G LTE packet-switched communication network 106 of the MO network 206, an action 424 is performed of initiating a handover of the voice communication session to a circuit-switched communication network. As described above, the handover may comprise an SRVCC handover, which is initiated using SRVCC procedures such as those defined by the $3^{rd}$-Generation Partnership Project (3GPP) Technical Specification (TS) 23.216.

The action 420 may in some cases be performed by the eUTRA 118 of the MO network 206. For example, the eUTRA 118 may determine that it lacks sufficient resources for a requested dedicated bearer and may send a message indicating this lack of resources to the MME 116. Similarly, the eUTRA 118 may encounter some other type of error and in response alert the MME 116 that establishing the requested dedicated bearer was not successful.

The action 420 may in some cases be performed by the MME 116 of the MO network 206. For example, the action 420 may comprise failing to receive a response from the eUTRA 118, which if received would have indicated that a dedicated bearer had been established. In some embodiments, the MME 116 may have a configurable timeout value. After requesting a dedicated bearer from the eUTRA 118, the MME 116 may conclude that an error has occurred if a response is not received from the eUTRA 118 within a time corresponding to the timeout value.

In other cases, the MME 116 of the MO network 206 may perform the action 420 in response to receiving a communication from the eUTRA 118. In some cases, for example, the action 420 may comprise detecting a resource limitation of the eUTRA 118 of the 4G packet-switched communication network 106. More specifically, a failure may be indicated by a message or other communication from the eUTRA 118. If such a message indicates that the resource preparation was not successful, the MME 116 may initiate the SRVCC handover by sending an SRVCC handover request as already described.

Although the examples discussed above relate to VoLTE call setup, a similar approach can be more generally to first and second communication networks, such as a current-generation communication network and a legacy communication network, where the legacy communication network is of an earlier or older generation than the current-generation communication network. For example, the approach may be applied to 5G Standalone (SA) Voice Over New Radio (VoNR). When the MO side set up fails, for example, similar techniques can be used to trigger an Evolved Packet System Fallback (EPSFB) to a 4G system rather than aborting the call, which would otherwise cause an MT-side answered call drop.

Figure 5:
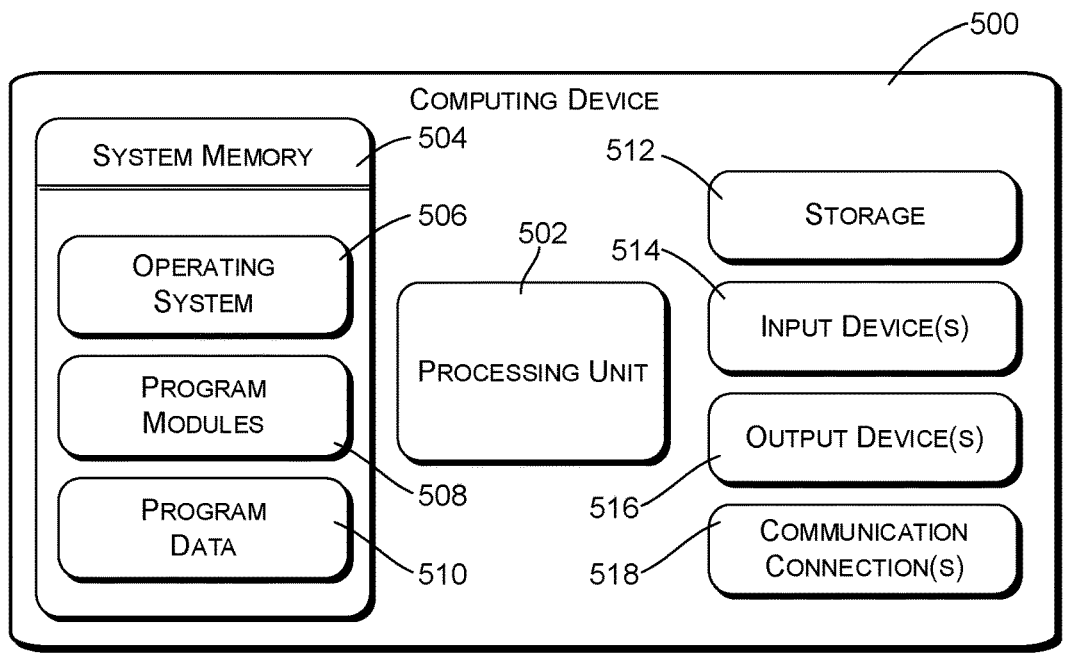
FIG. 5 is a block diagram of an example computing device that may be used to implement various functionality described herein.

FIG. 5 is a block diagram of an illustrative computing device 500 such as may be used to implement various components of a core network, a base station, and/or any servers, routers, gateways, administrative components, that may be used within a communications network. One or more computing devices 500 may be used to implement any of the network components shown in FIG. 1, any subcomponents of those network components, and any other components used for the system 100.

In various embodiments, the computing device 500 may include at least one processing unit 502 and system memory 504. Depending on the exact configuration and type of computing device, the system memory 504 may be volatile (such as RAM), non-volatile (such as ROM, flash memory, etc.) or some combination of the two. The system memory 504 may include an operating system 506, one or more program modules 508, and may include program data 510.

The computing device 500 may also include additional data storage devices (removable and/or non-removable) such as, for example, magnetic disks, optical disks, or tape. Such additional storage devices are illustrated in FIG. 5 as storage 512.

Non-transitory computer storage media of the computing device 500 may include volatile and nonvolatile, removable and non-removable media, implemented in any method or technology for storage of information, such as computer readable instructions, data structures, program modules, or other data. The system memory 504 and storage 512 are all examples of computer-readable storage media. Non-transitory computer-readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by computing device 500. Any such non-transitory computer-readable storage media may be part of the computing device 500.

In various embodiment, any or all of the system memory 504 and storage 512 may store programming instructions which, when executed, implement some or all of the function functionality described above.

The computing device 500 may also have input device(s) 514 such as a keyboard, a mouse, a touch-sensitive display, voice input device, etc. Output device(s) 516 such as a display, speakers, a printer, etc. may also be included. The computing device 500 may also contain communication connections 518 that allow the device to communicate with other computing devices.

Figure 6:
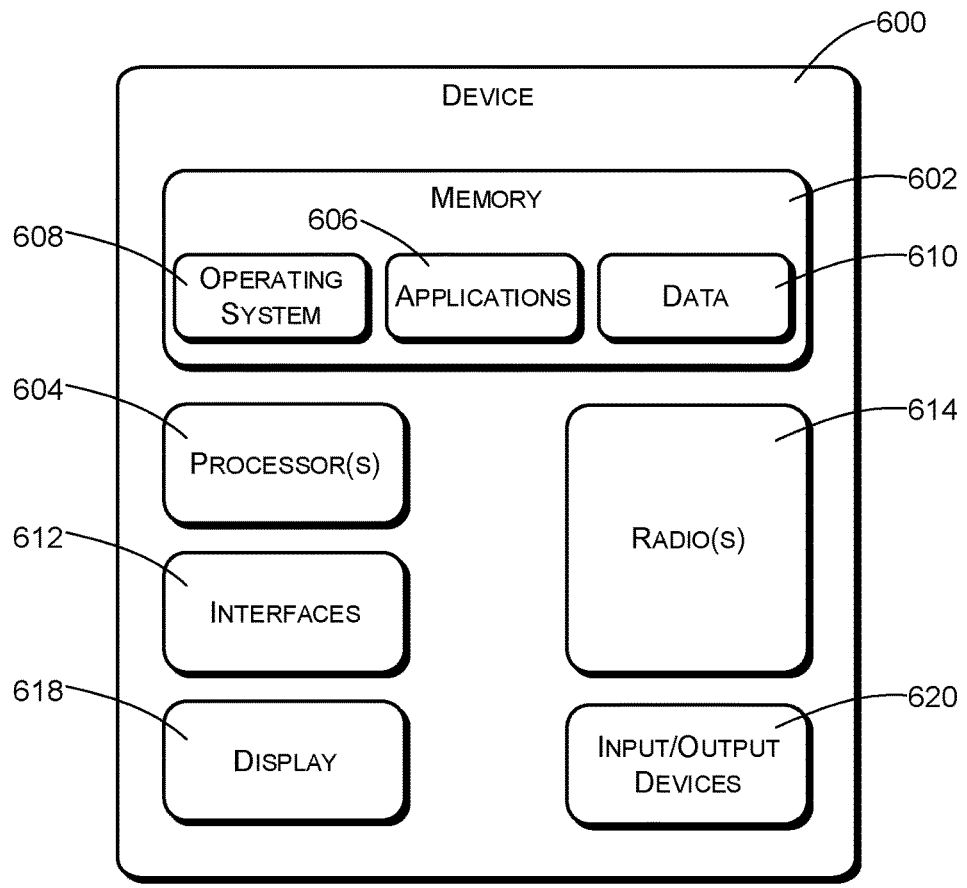
FIG. 6 is a block diagram of an example mobile communication device that may be used in conjunction with the techniques described herein.

FIG. 6 illustrates an example cellular communication device 600 that may be used in conjunction with the techniques described herein. The device 600 is an example of the communication device 120, illustrating high-level components that are not shown in FIG. 1.

The device 600 may include memory 602 and a processor 604. The memory 602 may include both volatile memory and non-volatile memory. The memory 602 can also be described as non-transitory computer-readable media or machine-readable storage memory, and may include removable and non-removable media implemented in any method or technology for storage of information, such as computer executable instructions, data structures, program modules, or other data. Additionally, in some embodiments the memory 602 may include a SIM (subscriber identity module), which is a removable smart card used to identify a user of the device 600 to a service provider network.

The memory 602 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information. The memory 602 may in some cases include storage media used to transfer or distribute instructions, applications, and/or data. In some cases, the memory 602 may include data storage that is accessed remotely, such as network-attached storage that the device 600 accesses over some type of data communication network.

The memory 602 stores one or more sets of computer-executable instructions (e.g., software) such as programs that embody operating logic for implementing and/or performing desired functionality of the device 600. The instructions may also reside at least partially within the processor 604 during execution thereof by the device 600. Generally, the instructions stored in the computer-readable storage media may include various applications 606 that are executed by the processor 604, an operating system (OS) 608 that is also executed by the processor 604, and data 610.

In some embodiments, the processor(s) 604 is a central processing unit (CPU), a graphics processing unit (GPU), both CPU and GPU, or other processing unit or component known in the art. Furthermore, the processor(s) 604 may include any number of processors and/or processing cores. The processor(s) 604 is configured to retrieve and execute instructions from the memory 602.

The device 600 may have interfaces 612, which may comprise any sort of interfaces known in the art. The interfaces 612 may include any one or more of an Ethernet interface, wireless local-area network (WLAN) interface, a near field interface, a DECT chipset, or an interface for an RJ-11 or RJ-45 port. A wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

The device 600 may also have one or more radios 614, which may be used as described above for 2G, 3G, 4G, and/or 5G communications. The radios 614 transmit and receive radio frequency communications via an antenna (not shown).

The device 600 may have a display 618, which may comprise a liquid crystal display (LCD) or any other type of display commonly used in telemobile devices or other portable devices. For example, the display 618 may be a touch-sensitive display screen, which may also act as an input device or keypad, such as for providing a soft-key keyboard, navigation buttons, or the like.

The device 600 may have input and output devices 620. These devices may include any sort of output devices known in the art, such as speakers, a vibrating mechanism, or a tactile feedback mechanism. Output devices may also include ports for one or more peripheral devices, such as headphones, peripheral speakers, or a peripheral display. Input devices may include any sort of input devices known in the art. For example, the input devices may include a microphone, a keyboard/keypad, or a touch-sensitive display. A keyboard/keypad may be a push button numeric dialing pad (such as on a typical telemobile device), a multi-key keyboard (such as a conventional QWERTY keyboard), or one or more other types of keys or buttons, and may also include a joystick-like controller and/or designated navigation buttons, or the like.

Although features and/or methodological acts are described above, it is to be understood that the appended claims are not necessarily limited to those features or acts. Rather, the features and acts described above are disclosed as example forms of implementing the claims.

What is claimed is:

1. A method performed by one or more components a cellular communication network to establish a voice communication session between an originating device and a terminating device, the method comprising:
   receiving a Session Initiation Protocol (SIP) INVITE request from the originating device to initiate a voice communication session;
   in response to the SIP INVITE request, sending an acknowledgement to the originating device;
   in further response to the SIP INVITE request, preparing first wireless communication resources of a terminating-side packet-switched communication network for a dedicated bearer with the terminating device;
   in response to the acknowledgement, attempting to prepare second wireless communication resources of an originating-side packet-switched communication network for a dedicated bearer with the originating device;
   detecting a failure of preparing the second wireless communication resources of the originating-side packet-switched communication network;
   in response to detecting the failure of preparing the second wireless communication resources of the originating-side packet-switched communication network, initiating a handover of an originating side of the voice communication session to an originating-side circuit-switched communication network, the handover being initiated by i) a handover message being transmitted by a base station of the originating-side packet-switched communication network and to a Mobility Management Entity (MME) of the originating-side packet-switched communication network, and ii) based on the handover message, a handover request being transmitted, by the MME and to a Mobile Switching Center (MSC) of the originating-side circuit-switched communication network; and in response to successfully preparing the first wireless communication resources and during and after the handover, continuing by the terminating device and the terminating-side packet-switched communication network with actions and communications to complete and conduct a terminating side of the voice communication session in accordance with packet-switched standards.

2. The method of claim 1, wherein initiating the handover comprises initiating a Single Radio Voice Call Continuity (SRVCC) handover.

3. The method of claim 1, wherein detecting the failure to reserve the second wireless communication resources comprises detecting a failure to receive a response from an Evolved Node B (eNB) base station of the originating-side packet-switched communication network.

4. The method of claim 1, wherein detecting the failure to reserve the second wireless communication resources comprises detecting a resource limitation of an Evolved Node B (eNB) base station of the originating-side packet-switched communication network.

5. The method of claim 1, wherein the originating-side circuit-switched communication network comprises a 2nd-Generation (2G) or 3rd-Generation (3G) cellular communication system.

6. The method of claim 1, wherein at least one of the originating-side packet-switched communication network or the terminating-side packet-switched communication network is a Long-Term Evolution (LTE) network.

7. A method performed by a cellular communication network to establish a voice communication session between an originating device and a terminating device, the method comprising:
receiving a first request from the originating device to initiate a voice communication session;
sending a second request to the terminating device to initiate the voice communication session;
attempting to prepare first resources of an originating-side packet-switched communication network for a dedicated bearer with the originating device;
attempting to prepare second resources of a terminating-side packet-switched communication network for a dedicated bearer with the terminating device;
detecting a failure of preparing the first resources of the originating-side packet-switched communication network;
in response to detecting the failure of preparing the first resources of the originating-side packet-switched communication network, transmitting, by a base station and to a Mobility Management Entity (MME) of the originating-side packet-switched communication network, a handover message to initiate a handover of an originating side of the voice communication session to an originating-side circuit-switched communication network, the handover being initiated by i) the handover message being transmitted by the base station of the originating-side packet-switched communication network, and ii) based on the handover message, a handover request being transmitted, by the MME and to a Mobile Switching Center (MSC) of the originating-side circuit-switched communication network; and
in response to successfully preparing the second resources and during and after the handover, continuing by the terminating device and the terminating-side packet-switched communication network with actions and communications to complete and conduct a terminating side of the voice communication session in accordance with packet-switched standards.

8. The method of claim 7, wherein initiating the handover comprises initiating a Single Radio Voice Call Continuity (SRVCC) handover to the originating-side circuit-switched communication network.

9. The method of claim 7, wherein detecting the failure of preparing the first resources of the originating-side packet-switched communication network comprises failing to receive a response from a radio access network base station of the originating-side packet-switched communication network.

10. The method of claim 7, wherein detecting the failure of preparing the first resources of the originating-side packet-switched communication network comprises detecting a resource limitation of a radio access network base station of the originating-side packet-switched communication network.

11. The method of claim 7, wherein the originating-side circuit-switched communication network comprises a 2nd-Generation (2G) or 3rd-Generation (3G) cellular communication system, and
wherein at least one of the originating-side packet-switched communication network or the terminating-side packet-switched communication network comprises a Long-Term Evolution (LTE) network.

12. The method of claim 7, wherein
the handover request indicates to the MSC the handover being previously initiated by the base station of the originating-side packet-switched communication network.

13. A system, comprising:
one or more processors; and
one or more non-transitory computer-readable media storing computer-executable instructions that, when executed by the one or more processors, cause the system to perform actions comprising:
receiving a first request from an originating cellular communication device to initiate a voice communication session;
sending a second request to a terminating cellular communication device to initiate the voice communication session;
in response to receiving the first request, attempting to prepare first wireless communication resources of an originating-side, first communication network for a dedicated bearer with the originating cellular communication device;
based on the second request, attempting to prepare second wireless communication resources of a terminating-side packet-based communication network for a dedicated bearer with the terminating cellular communication device;
detecting a failure of preparing the first wireless communication resources of the originating-side, first communication network;
in response to detecting the failure of preparing the first wireless communication resources of the originating-side, first communication network, transmitting, by a base station and to a Mobility Management Entity (MME) of the originating-side, first communication network, a handover message to initiate a handover to an originating-side, second communication network, the handover being initiated by i) the handover message being transmitted by the base station of the originating-side, first communication network, and ii) based on the handover message, a handover request being transmitted, by the MME and to a Mobile Switching Center (MSC) of the originating-side, second communication network; and in response to successfully preparing the second wireless communication resources and during and after the handover, continuing by the terminating cellular communication device and the terminating-side packet-based communication network with actions and communications to complete and conduct a terminating side of the voice communication session in accordance with packet-switched standards.

14. The system of claim 13, wherein:
the originating-side, first communication network is a 4th-Generation (4G) or later packet-switched communication network;
the originating-side, second communication network is a 3rd-Generation (3G) or earlier circuit-switched communication network; and
initiating the handover comprises initiating a Single Radio Voice Call Continuity (SRVCC) handover to the 3G or earlier circuit-switched communication network.

15. The system of claim 13, wherein:
the originating-side, first communication network comprises a 5th-Generation (5G) or later packet-switched communication network;
the originating-side, second communication network comprises a 4th-Generation (4G) or earlier circuit-switched communication network; and
initiating the handover comprises initiating a Evolved Packet System Fallback (EPSFB).

16. The system of claim 13, wherein the base station of the originating-side, first communication network comprises a radio access network base station, and
wherein detecting the failure of preparing the first wireless communication resources of the originating-side, first communication network comprises failing to receive a response from the radio access network base station of the originating-side, first communication network.

17. The system of claim 13, wherein detecting the failure of preparing the first wireless communication resources of the originating-side, first communication network comprises detecting a resource limitation of a radio access network base station of the originating-side, first communication network.

18. The system of claim 13, wherein at least one of the originating-side, first communication network, the terminating-side packet-based communication network, or the originating-side, second communication network comprises a Long-Term Evolution (LTE) network.

19. The system of claim 13, wherein initiating the handover is performed by an eNodeB associated with the originating-side, first communication network.

20. The system of claim 13, wherein initiating the handover is performed by a Mobility Management Entity (MME) of the originating-side, first communication network.

* * * * *